Sept. 5, 1944.  R. G. MOENCH, JR  2,357,679
DOUGH OILING MACHINE
Filed Nov. 26, 1941  2 Sheets-Sheet 1
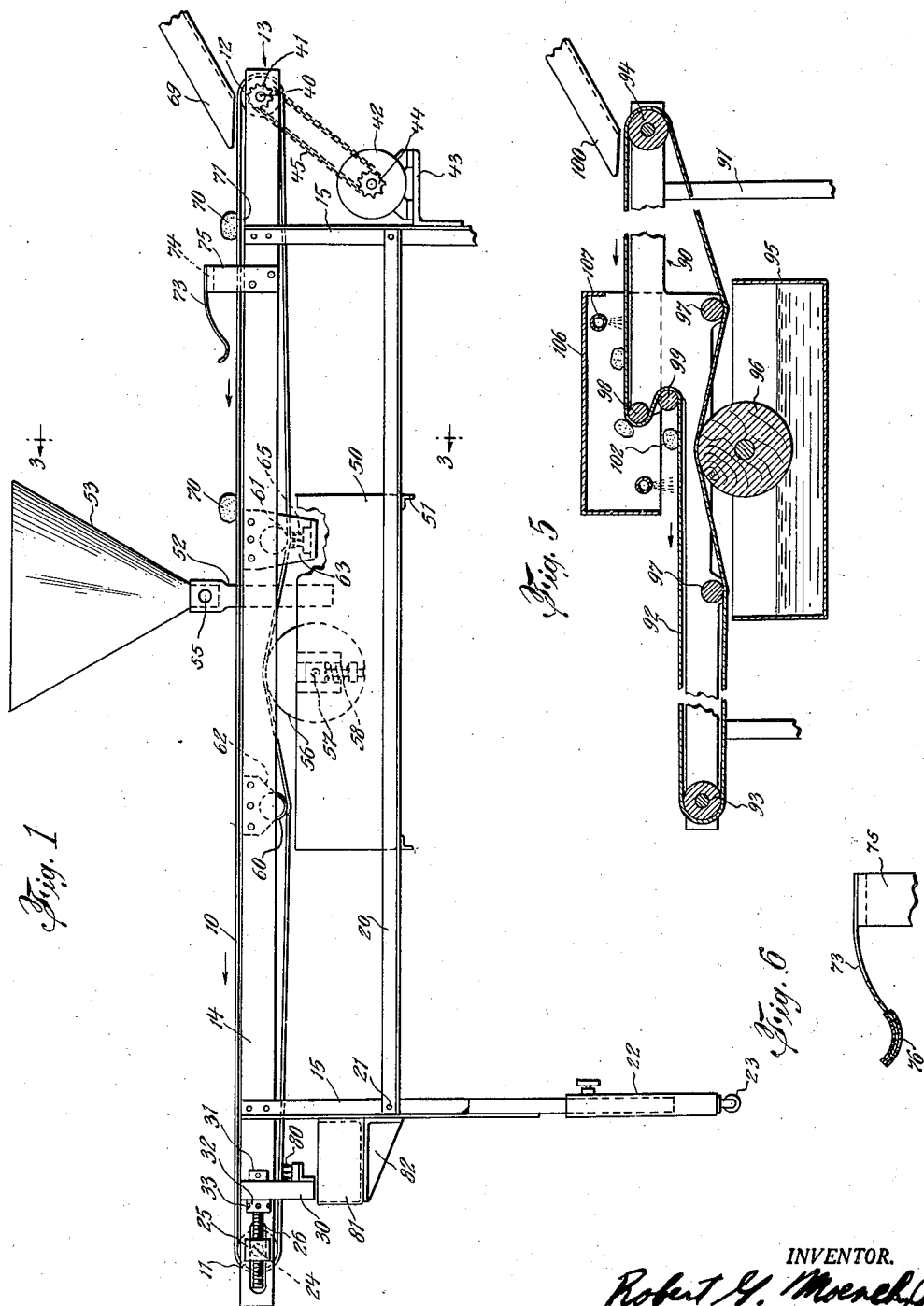
INVENTOR.
Robert G. Moench Jr
BY John P. Chandler
his attorney

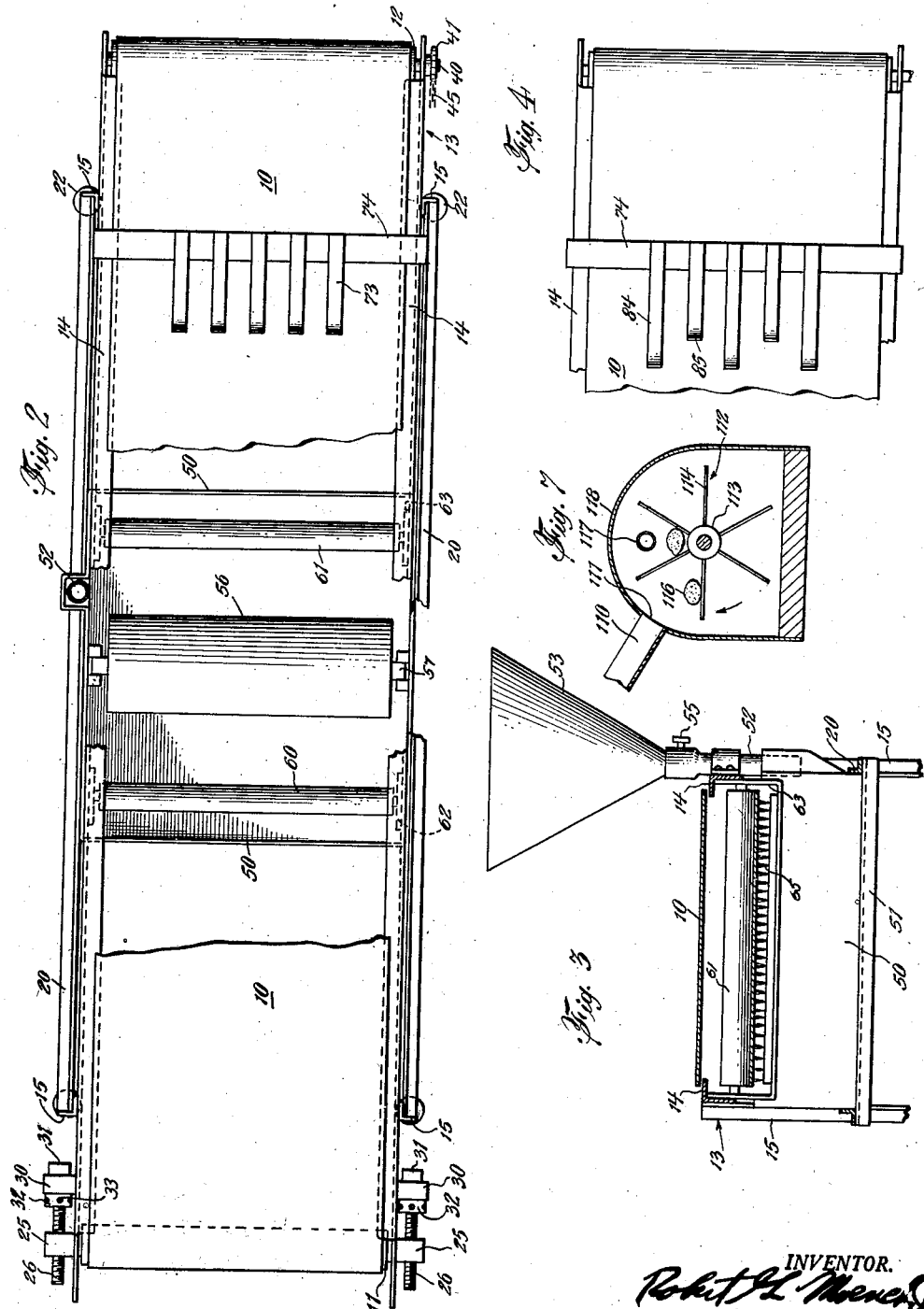

Patented Sept. 5, 1944

2,357,679

UNITED STATES PATENT OFFICE 2,357,679

DOUGH OILING MACHINE

Robert G. Moench, Jr., Columbus, Ohio, assignor to Moench Corp., New York, N. Y., a corporation of New York Application November 26, 1941, Serial No. 420,599

6 Claims. (Cl. 91—2)

This invention relates to new and useful improvements in machines for applying oil or other lubricants to portions of bread dough prior to insertion within the baking pan, the invention relating more particularly to an improved dough oiling machine designed primarily for bakeries where high speed, continuous production is required.

It is known, of course, that a lubricating substance must be applied either to the dough or to the interior of the baking pan prior to the baking operation, in order to prevent the finished loaf from adhering to the pan. In accordance with current practices in the art, the oil is generally applied to the interior of the pan by an automatic or semi-automatic brushing device and, as a result, a considerable surface of the pan not touched by the dough is nevertheless oiled, and this wasted oil burns during the baking operation, causing an unpleasant smell and sometimes affecting the flavor of the bread. In cases wherein the loaf of dough, as distinguished from the pan, is oiled, the operation is usually a slow, manual one.

It is one of the principal objects of the present invention to provide an automatic dough oiling machine including a conveyor structure for receiving the loaves or rolls of dough as they are fed from the dough molding machine, and when the loaves of dough are conveyed to the delivering end of the machine a fine coating of oil has been deposited only on the surfaces requiring lubrication.

Another object of the invention is the provision of a machine of this character having means for quickly applying a film of oil to the desired surface of the roll of dough, and applying it in such a manner as to effect a distinct saving of oil.

Still another object of the invention is to provide a dough oiling machine which is simple in operation and relatively inexpensive to construct.

Other objects will be hereinafter specifically pointed out, or will become apparent, as the specification proceeds.

In the drawings:

Fig. 1 is a side elevation of the preferred embodiment of the present invention.

Fig. 2 is a top plan view thereof, parts of the device being broken away.

Fig. 3 is a transverse vertical section taken on line 3—3 of Fig. 1.

Fig. 4 is a broken top plan view of the structure shown in Fig. 2 and illustrating a modified form of loaf-turning means.

Fig. 5 is a broken longitudinal vertical section of a modified form of the present invention, the structure illustrated being largely diagrammatic.

Fig. 6 is a side elevation, partially in section, of a modified form of loaf-turning means.

Fig. 7 is a longitudinal section showing another form of the invention.

The preferred embodiment of the present invention illustrated in Figs. 1 to 3, inclusive, includes an endless belt 10 and supporting rollers 11 and 12 for the belt, such rollers being suitably journalled at opposite ends of a frame structure 13. The endless belt 10 is desirably formed of fabric or like material having a coating of any suitable material which will render the fabric impervious to oils and the like. The frame structure includes spaced longitudinal members 14 which are preferably inverted L shaped in transverse section, as shown in Fig. 3. The frame members 14 are supported by a plurality of vertical posts or legs 15, also angular in transverse section, and such vertical posts 15 are maintained in their spaced relationship by means of transverse bars or spacers. Also, in order to give greater stability to the frame, longitudinally disposed angle members 20 are secured at their terminals, as shown at 21, to vertical posts 15 at a point spaced downwardly from the upper longitudinal frame members 14.

Inasmuch as a device of this character is employed in association with various types of dough-molding machines, the height of the frame structure and of the endless belt 10 carried thereby is desirably made variable by providing slidable leg extensions 22, preferably having casters 23 at their lower ends. At each end of the frame structure, frame members 14 extend beyond vertical posts or legs 15, and in order to take up slack in the endless belt, shaft 24 carrying roller 11 is journalled at each end thereof in a block 25 having a horizontal threaded aperture therethrough which receives a threaded lead screw 26 journalled in a vertical member 30 secured adjacent to the terminal of frame member 14. Lead screw 26 is secured against longitudinal movement in its supporting aperture by means of a collar 31 on one side of member 30, and by a second collar 32 on the opposite side of such member. Collar 32 is keyed to lead screw 26 and is provided with a plurality of spaced apertures 33 into any one of which a pin or key may be inserted in order to rotate the lead screw 26, thus moving the supporting blocks outwardly to take up slack in endless belt 10, or inwardly to provide additional slack, if desired.

At the opposite end of frame structure 13, shaft 40 carrying roller 12 is suitably journalled, such shaft carrying a sprocket 41 at one end thereof. An electric motor 42, or any other suitable prime mover, may be supported as at 43 on the frame structure, such motor preferably having gear reduction means (not shown) and a sprocket 44 on its shaft, sprockets 44 and 41 being connected by means of a drive chain 45. An oil reservoir 50 is supported in any desired manner below horizontal rails 14 of frame structure 13, it being preferred to support such reservoir on frame members 20, and if desired transverse members 51 may also be provided. In order to provide means for periodic cleaning of oil reservoir 50, such reservoir should be removable from the frame structure. Oil is fed into the reservoir through a vertical supply pipe 52 suitably mounted in the frame structure, and at the upper end of such supply pipe a supply reservoir 53 may be positioned. Adjacent to the upper end of the supply pipe 52 a conventional shut-off valve 55 is positioned.

The oil contained in reservoir 50 is applied to the under surface of endless belt 10 by means of a coating roller 56 having a shaft 57 which is suitably journalled substantially midway between the opposite terminals of frame structure 13. The shaft 57 and the roller carried thereby are made removable from the journal support, as shown in Fig. 2, and such shaft is preferably adjustable by means shown at 58 in Fig. 1. Whereas any suitable material may be employed for the construction of the roller 56, it is preferable to make such roller from wood. In order to assure contact between the endless belt 10 and roller 56, a pair of idler rollers 60 and 61 are suitably journalled in the frame, as shown at 62 and 63, respectively. Means 63 for supporting roller 61 desirably extend downwardly below the upper edge of reservoir 50 and also support brushing element 65 which is adapted to remove excess oil from the lower surface of endless belt 10. If desired, a doctor blade could be substituted for the brushing element 65, although better results have been obtained with the brush. The excess oil removed by the brushing element drops back into reservoir 50, as will be readily appreciated.

The loaves or rolls of dough indicated at 70 are fed onto the upper surface of the endless belt by means of an inclined conveyor trough 69 which is suitably affixed to a dough-molding machine (not shown). Such molding machine molds the dough into generally cylindrical rolls of any given length, and the rolls of dough are intermittently fed and occupy a spaced position on the upper surface of conveyor belt 10, as will be appreciated. The rolls of dough being relatively soft will, when they are received upon the conveyor belt, flatten out somewhat, as indicated at 71, and accordingly the oil which has been deposited on the now upper surface of conveyor belt 10 will be applied to an area representing substantially one-third of the external periphery of the roll of dough.

It is desirable, however, to apply oil to a still greater proportion of such outer periphery, and the following means are provided for rotating the roll sufficiently to cause the oil to be applied to substantially two-thirds of its outer periphery. These means include a plurality of fingers 73 shaped generally as shown in Fig. 1. Each finger is preferably formed from a length of spring steel, or other suitable material, and is suitably mounted on a transverse bar 74 which is supported at opposite ends by means of vertical members 75 secured to longitudinal frame members 14. If desired, the bar 74 may be made adjustable as to height, or the several fingers may themselves be made independently adjustable. Also, the outer terminals of the fingers which engage the rolls of dough may be covered with fabric or other material, as shown at 76 in Fig. 6. At the opposite end of the frame a second brush 80 may be supported at the lower end of vertical members 30 to remove any accumulation of oil on the belt after the rolls of dough have been manually removed from the conveyor. Reservoir 81 supported on the frame structure by means of a bracket 82 collects such oil removed by brush 80. In operation, the rolls of dough are fed from the molding machine down the inclined chute 69, as aforesaid, and are received upon the conveyor belt moving in the direction of the arrows, shown in Fig. 1. These rolls of dough passing under fingers 73 are rotated to apply oil to a considerable portion of the outer periphery of such rolls, and when the rolls approach the opposite terminal of the conveyor structure, they are removed by the operators who place the same in suitable pans, all as is well known in the art.

A slight modification in the structure is shown in Fig. 4, wherein alternate long and short fingers 84 and 85, respectively, are provided, such arrangement being preferable in certain instances wherein the lengths of the rolls of dough vary. The modified structure of Fig. 5 includes a frame structure 90 formed with supporting legs 91, an endless belt 92 similar to belt 10, and supporting rollers 93 and 94 at opposite ends of the frame structure. Oil is fed from reservoir 95 to coating roller 96, the conveyor belt being held in engagement with the coating roller by means of idler rollers 97, as in the preferred embodiment. In this instance, however, the upper surface of the conveyor belt is not plane throughout its length, but rather is its surface interrupted by means of idler rollers 98 and 99. The rolls of dough are fed onto the upper surface of the conveyor belt by means of the inclined chute 100, and oil is thus applied to the lower surfaces of such rolls as in the preferred embodiment. When the rolls arrive at a position just beyond idler roller 98, however, they drop to the lower surface of the conveyor belt, which position is shown at 102, and the difference in level between the upper and lower surfaces of the conveyor belt is so proportioned as to cause the rolls of dough to partly rotate in falling, and thus present an adjacent surface to the conveyor belt.

In some instances, it is desirable to provide a coating of oil over the entire external surface of the roll of dough, and to accomplish this a housing 106 is suitably supported above the upper surface of the conveyor belt 92. Within the housing one or more oil spray tubes 107 are positioned, such tubes having suitable spray nozzle apertures to cause the oil to be applied either continuously or intermittently to the conveyor belt and to the rolls of dough contained thereon. In an arrangement of this character it will be appreciated that coating roller 96 could be eliminated entirely and the oil applied to the loaves in the form of a spray or mist, which will give the loaves a coating on all sides thereof. A housing similar to housing 106 could, of course, be applied to the structure shown in Fig. 1, and in this case the coating roller 56 could be eliminated entirely.

In the modified structure shown in Fig. 7, the endless conveyor is eliminated entirely and the dough is fed from the inclined chute 110 through an opening 111 onto a rotating member 112 comprising a roller 113 and a plurality of radially disposed solid or perforated plates 114. Oil is applied to the rolls 116 by means of a spray device shown diagrammatically at 117, which may comprise an elongated tube having a plurality of nozzle apertures which may spray the oil continuously or intermittently. The entire device is enclosed within a housing 118.

The particular oil, lubricant or other grease which is applied to the molded loaves of dough by the machine of the present invention is, of course, a matter of choice, and whenever the terms "greasing" or "lubricating" are used in this specification or in the appended claims, it is to be understood that such terms include the application of any oily material to the loaves which will prevent the loaves from adhering to the pan during the baking operation. It will also be appreciated that many changes and modifications may be made in connection with the structures herein disclosed without departing from the spirit of the invention as defined by the appended claims, the embodiments illustrated and described being merely for the purpose of illustration and are not offered in any limiting sense.

What I claim is:

1. In a machine for applying oil or the like to loaves of dough prior to insertion within a baking pan, the combination of a supporting frame, a roller journalled at each end of the frame, an endless conveyor belt carried by said rollers, such belt being formed from flexible material provided with a coating impervious to the oil, means comprising a prime mover for driving the conveyor belt, an oil reservoir, a coating roller for applying a thin film of oil from the reservoir to the surface of the conveyor, and idler rollers on each side of the coating roller for urging the belt into engagement with the coating roller, whereby the oil on such surface will be transferred to the surface of loaves of dough delivered to the conveyor belt.

2. In a machine for applying greasing material to loaves of dough prior to insertion within a baking pan, the combination of a supporting frame, a roller journalled at each end of the frame, an endless conveyor belt carried by said rollers, slack-removing means associated with one of the rollers, means comprising a prime mover connected with the second roller for driving the conveyor belt, an oil reservoir carried by the frame, a coating roller for applying a thin film of greasing material from the reservoir to the surface of the conveyor, whereby the material on such surface will be transferred to the surface of loaves of dough delivered to the conveyor belt, and means for partially rotating the loaves after the material has been so transferred comprising a plurality of loaf-engaging fingers spaced from the upper surface of the conveyor belt in the path of movement of the loaves, adapted to engage the loaves during travel.

3. In a machine for applying oil or the like to loaves of dough prior to insertion within a baking pan and having a supporting frame, a roller journalled at each end of the frame, an endless conveyor belt carried by said rollers, slack-removing means associated with one of the rollers, means comprising a prime mover for driving the conveyor belt, the combination of an oil reservoir carried by the frame, a coating roller for applying a thin film of oil from the reservoir to the surface of the conveyor, whereby the oil on such surface will be transferred to the surface of loaves of dough delivered to the conveyor belt, and means for partially rotating the loaves after the oil has been so transferred comprising a loaf-engaging element spaced from the upper surface of the conveyor belt in the path of movement of the loaves, adapted to engage the loaves during travel.

4. In a machine for applying greasing material to loaves of dough prior to insertion within a baking pan and having a supporting frame, a roller journalled at each end of the frame, an endless conveyor belt carried by said rollers, slack-removing means associated with one of the rollers, means comprising a prime mover for driving the conveyor belt, an oil reservoir carried by the frame, the combination of a coating roller for applying a thin film of greasing material from the reservoir to the surface of the conveyor, whereby the material on such surface will be transferred to the surface of loaves of dough delivered to the conveyor belt, and means for partially rotating the loaves after the material has been so transferred comprising a plurality of spaced, alternate long and short loaf-engaging fingers spaced from the upper surface of the conveyor belt in the path of movement of the loaves, adapted to engage the loaves during travel.

5. In a machine for applying a liquid lubricant to loaves of dough prior to insertion within a baking pan, the combination of an endless conveyor belt, a pair of terminal rollers supporting such belt, means for applying a thin film of the liquid lubricant to the belt, and a pair of superimposed idler rollers around which the upper portion of the belt passes to cause said upper portion to travel on a higher and then a lower plane, whereby the loaves of dough fed onto the belt on the higher plane will receive a coating of oil on one surface thereof and then drop to the lower plane to receive a coating of oil on another surface thereof.

6. In a machine for applying oil or the like to loaves of dough prior to insertion within a baking pan, the combination of a supporting frame, a roller journalled at each end of the frame, an endless conveyor belt carried by said rollers, slack-removing means associated with one of the rollers to permit said roller to be adjustably moved longitudinally of the frame, means for driving the conveyor belt, an oil reservoir carried by the frame, a coating roller for applying a thin film of oil from the reservoir to the surface of the conveyor, whereby the oil on such surface will be transferred to the surface of loaves of dough delivered to the conveyor belt, and means for imparting a partial rotation to the loaves of dough comprising a loaf-engaging finger mounted above the upper surface of the conveyor belt in adjustable relationship to such belt.

ROBERT G. MOENCH, Jr.